United States Patent
Konduru

(10) Patent No.: US 11,886,264 B2
(45) Date of Patent: Jan. 30, 2024

(54) LOAD TRANSIENT DETECTION CIRCUIT AND METHOD

(71) Applicant: Cypress Semiconductor Corporation, San Jose, CA (US)

(72) Inventor: Ravi Konduru, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 71 days.

(21) Appl. No.: 17/469,620

(22) Filed: Sep. 8, 2021

(65) Prior Publication Data
US 2022/0083112 A1 Mar. 17, 2022

Related U.S. Application Data

(60) Provisional application No. 63/078,660, filed on Sep. 15, 2020.

(51) Int. Cl.
| | |
|---|---|
| *G06F 1/26* | (2006.01) |
| *G06F 13/42* | (2006.01) |
| *H02M 1/00* | (2006.01) |
| *H02M 3/156* | (2006.01) |
| *H02M 3/158* | (2006.01) |

(52) U.S. Cl.
CPC .......... *G06F 1/266* (2013.01); *G06F 13/4282* (2013.01); *H02M 1/0009* (2021.05); *H02M 1/0019* (2021.05); *H02M 3/1566* (2021.05); *H02M 3/1582* (2013.01); *G06F 2213/0042* (2013.01)

(58) Field of Classification Search
CPC ...... G06F 1/266; G06F 1/3203; G06F 1/3237; G06F 13/4282; G06F 2213/0042; H02M 1/0009; H02M 1/0019; H02M 3/1566; H02M 3/1582
See application file for complete search history.

(56) References Cited

U.S. PATENT DOCUMENTS 10,955,865 B1 3/2021 Muninarayanappa et al.
11,527,957 B2 * 12/2022 Karri .................. H02M 3/1582
(Continued)

OTHER PUBLICATIONS

"USB PD power adapter SR controller". EZ-PD™ PAG1S-CYPD3184. Revision D. Jun. 16, 2022. Infineon Technologies AG. (Year: 2022).*
(Continued)

*Primary Examiner* — Thomas J. Cleary

(57) ABSTRACT

A Universal Serial Bus (USB)-Power Delivery (PD) integrated circuit (IC) controller is described. The controller includes: a driver circuit configured to control operation of a buck-boost converter electrically coupled to a USB voltage bus power line; a gate driver controller configured to control the driver circuit in a first mode, wherein changes in duty cycle are limited to a predetermined number of cycles in the first mode; a sense circuit configured to generate a sense signal proportional to current flowing in the USB voltage bus power line; and an analog detection circuit configured to detect whether a slew rate of the sense signal exceeds a reference slew rate. The gate driver controller is configured to override the limit placed on the changes in duty cycle in the first mode responsive to the analog detection circuit indicating that the slew rate of the sense signal exceeds the reference slew rate.

21 Claims, 9 Drawing Sheets

(56) References Cited

U.S. PATENT DOCUMENTS

| | | | | |
|---|---|---|---|---|
| 11,658,574 B2* | 5/2023 | Rai | H02M 1/0025 | |
| | | | 323/271 | |
| 11,671,013 B2* | 6/2023 | Khamesra | H02M 1/36 | |
| | | | 327/538 | |
| 2011/0187336 A1* | 8/2011 | Wu | G05F 1/10 | |
| | | | 323/282 | |
| 2015/0062108 A1* | 3/2015 | Archibald | G06F 1/26 | |
| | | | 345/212 | |
| 2015/0229215 A1* | 8/2015 | Choudhary | H02M 3/1582 | |
| | | | 323/271 | |
| 2017/0155331 A1* | 6/2017 | Lee | H02M 3/33523 | |
| 2020/0127575 A1* | 4/2020 | Liu | G06F 1/266 | |
| 2021/0203239 A1* | 7/2021 | Karasawa | G01R 1/203 | |
| 2021/0257998 A1* | 8/2021 | Fesler | H02M 1/0025 | |
| 2021/0320514 A1* | 10/2021 | Polasa | H02M 3/1563 | |
| 2022/0069711 A1* | 3/2022 | Karri | H02M 1/0016 | |
| 2022/0069712 A1* | 3/2022 | Mondal | H02M 3/1582 | |
| 2023/0291314 A1* | 9/2023 | Karri | H02M 3/1582 | |
| | | | 323/259 | |

OTHER PUBLICATIONS

"EZ-PD™ CCG7D Automotive USB Type-C and Buck-boost Controller". CYPD7291. Revision N. Jan. 31, 2023. Infineon Technologies AG. (Year: 2023).*

"USB Power Delivery 4-Switch Buck Boost Controller". NCP81239, NCP81239A. Revision 7. Jan. 2019. Semiconductor Components Industries, LLC. (Year: 2019).*

* cited by examiner

LOAD TRANSIENT DETECTION CIRCUIT AND METHOD

PRIORITY

This application claims the benefit of U.S. Provisional Application No. 63/078,660, filed on Sep. 15, 2020, the entire content of which is incorporated herein by reference in its entirety.

BACKGROUND

The Universal Serial Bus (USB)-Power Delivery (PD) specification permits delivery of increased power (e.g., more than 7.5 W) to devices with greater power demands. Devices can request higher currents and supply voltages from compliant hosts, e.g., up to 2 A at 5 V (up to 10 W) and optionally up to 3 A or 5 A at either 12 V (36 W or 60 W) or 20 V (60 W or 100 W). A USB-PD controller provides cable plug and orientation detection for one or more USB Type-C connectors. When cable detection and USB-PD negotiation are complete, the controller typically enables the appropriate power path, among other functions. USB-PD integrated circuit (IC) controllers include several different types of circuits on the same semiconductor die for performing these and other functions.

One such circuit included in USB-PD IC controllers is a finite state machine for detecting USB voltage bus (VBUS) load transients, whenever a load transient is greater than a certain programmed ramp-rate value. VBUS load transient detection can be used to reduce VBUS overshoot/undershoot due to load transients. In a smooth transition mode during which changes in duty cycle are limited to a fixed number of cycles, and if there is a sudden load transient in the smooth transition mode, the duty cycle may need to change more than the limit set by the finite state machine to yield acceptable VBUS overshoot/undershoot. But since the duty cycle change is limited in the smooth transition mode, VBUS overshoot/undershoot will be more extreme. In this case, load transient detection information can be used to momentarily remove the duty cycle limit so that the finite state machine can change the duty cycle as per loop requirement, which in turn improves VBUS transient behavior. Conventionally, a current sense amplifier (CSA) senses the load current through a sense resistor in the VBUS path and the output of the current sense amplifier is converted by an analog-to-digital converter (ADC) and input to the finite state machine. Based on the present CSA value, firmware associated with the finite state machine calculates the next reference value setting to prepare for the next load change detection. A comparator detects a VBUS load transient by taking inputs from the CSA and a reference generator which uses the setting calculated by the firmware.

Detection using firmware is slow, as firmware cannot react faster than 10 us to 100 us depending on the firmware activity level. Also, load current is not conventionally monitored continuously as the ADC must measure the existing CSA output and the firmware must calculate the next reference value settings. Because of more delays involved due to the ADC and firmware implementation of load transient detection, VBUS overshoot/undershoot will be more extreme.

Thus, there is a need for an improved USB-PD IC controller that better limits VBUS overshoot/undershoot in the smooth transition mode.

SUMMARY

According to an embodiment of a Universal Serial Bus (USB)-Power Delivery (PD) integrated circuit (IC) controller, the USB-PD IC controller comprises: a driver circuit configured to control operation of a buck-boost converter electrically coupled to a USB voltage bus power line; a gate driver controller configured to control the driver circuit in a first mode, wherein changes in duty cycle are limited to a predetermined number of cycles in the first mode; a sense circuit configured to generate a sense signal proportional to current flowing in the USB voltage bus power line; and an analog detection circuit configured to detect whether a slew rate of the sense signal exceeds a reference slew rate, wherein the gate driver controller is configured to override the limit placed on the changes in duty cycle in the first mode responsive to the analog detection circuit indicating that the slew rate of the sense signal exceeds the reference slew rate.

According to an embodiment of a method of operating a Universal Serial Bus (USB)-Power Delivery (PD) integrated circuit (IC) controller, the method comprises: controlling, via a driver circuit of the USB-PD IC controller, operation of a buck-boost converter electrically coupled to a USB voltage bus power line; controlling the driver circuit in a first mode, wherein changes in duty cycle are limited to a predetermined number of cycles in the first mode; generating a sense signal proportional to current flowing in the USB voltage bus power line; detecting, via an analog detection circuit, whether a slew rate of the sense signal exceeds a reference slew rate; and overriding the limit placed on the changes in duty cycle in the first mode responsive to the analog detection circuit indicating that the slew rate of the sense signal exceeds the reference slew rate.

According to an embodiment of a Universal Serial Bus (USB)-Power Delivery (PD) device, the USB-PD device comprises: a buck-boost converter electrically coupled to a USB voltage bus power line; and a USB-PD integrated circuit (IC) controller coupled to control operation of the buck-boost converter, the USB-PD IC controller comprising: a gate driver controller configured to control the buck-boost converter in a first mode, wherein changes in duty cycle are limited to a predetermined number of cycles in the first mode; a sense circuit configured to generate a sense signal proportional to current flowing in the USB voltage bus power line; and an analog detection circuit configured to detect whether a slew rate of the sense signal exceeds a reference slew rate, wherein the gate driver controller is configured to override the limit placed on the changes in duty cycle in the first mode responsive to the analog detection circuit indicating that the slew rate of the sense signal exceeds the reference slew rate.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a USB-PD IC controller, method of operating a USB-PD IC controller, and a USB-PD device that includes a buck-boost converter. The USB-PD IC controller better limits VBUS overshoot/undershoot in a smooth transition mode during which changes in duty cycle are limited to a fixed number of cycles. A sense signal proportional to current flowing in the USB voltage bus power line is input to an analog detection circuit which detects whether a slew rate of the sense signal exceeds a reference slew rate. A gate driver controller for a driver circuit that controls operation of the buck-boost converter overrides the limit placed on changes in duty cycle in the smooth transition mode, responsive to the analog detection circuit indicating that the slew rate of the sense signal exceeds the reference slew rate.

By using an analog circuit to detect when the slew rate of the sense signal becomes excessive, VBUS load transient response in the smooth transition mode is improved compared with using firmware-based detection. Quicker VBUS load transient response in the smooth transition mode allows for the use of a smaller capacitor electrically coupled to the USB voltage bus power line. The capacitor size may be reduced by at least 2× times using the analog-based load transient detection technique described herein compared with using firmware to implement the detection. For example, the capacitor may have a capacitance of 0.5 millifarads (mF) or less compared to typically used capacitance of 1 mF. The analog-based load transient detection technique described herein is scalable to detect higher/lower slew rates and is highly accurate across process, voltage and temperature variations. For example, simulations have shown a detected slew rate variation of less than 6% over a temperature range of −40 C to 150 C.

Described next, with reference to the figures, are exemplary embodiments of the USB-PD IC controller, method of operating the USB-PD IC controller, and a USB-PD device that includes the USB-PD IC controller. In general, the load transient detection technique described herein may be used to detect any sudden load transients on the VBUS supply.

Figure 1:
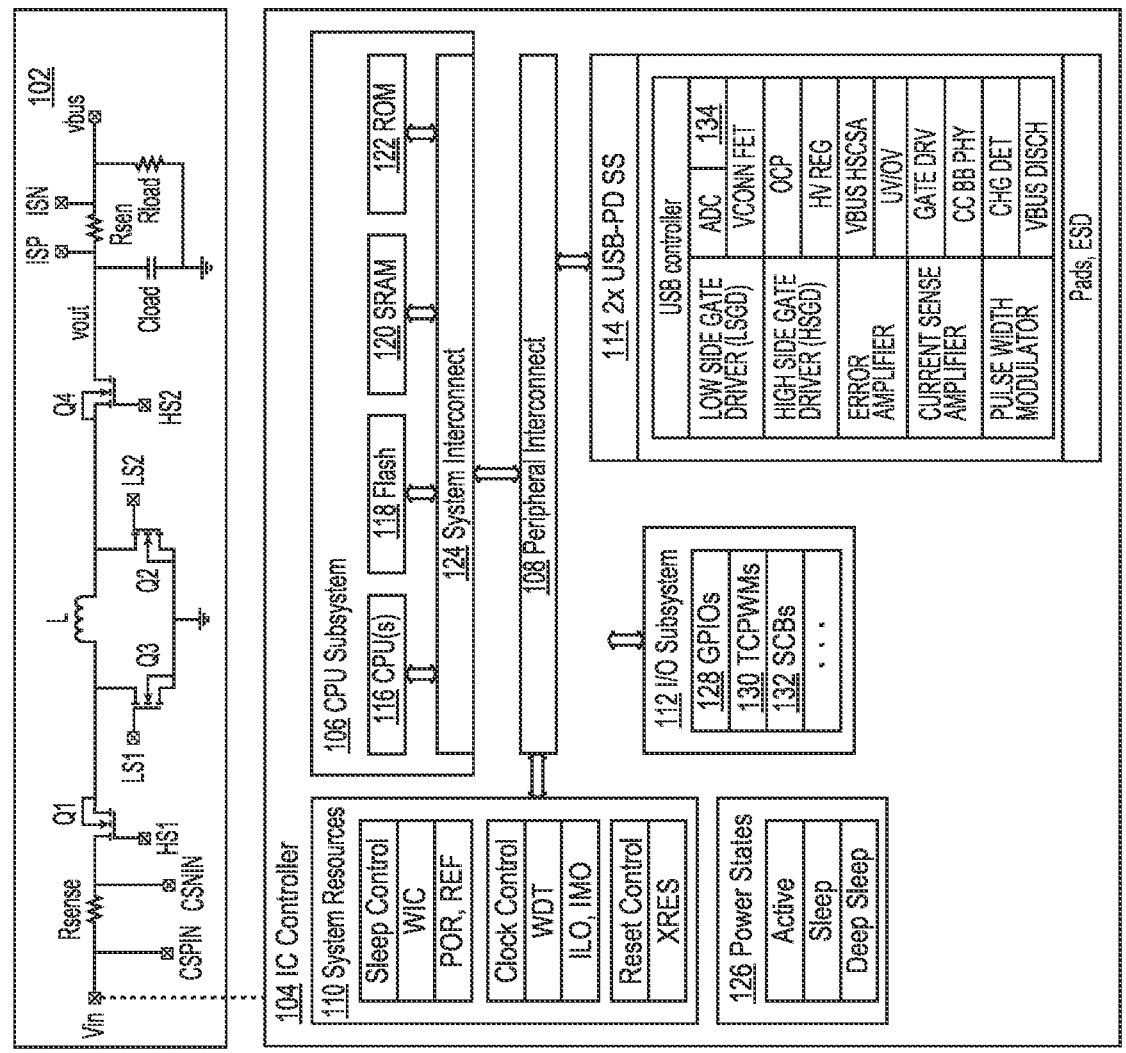
FIG. 1 illustrates a block diagram of an embodiment of a USB-PD device that includes a buck-boost converter and a USB-PD IC controller coupled to control operation of the buck-boost converter.

FIG. 1 illustrates a block diagram of an embodiment of a USB-PD device 100 that includes a buck-boost converter 102 and a USB-PD IC controller 104 coupled to control operation of the buck-boost converter 102. The buck-boost converter 102 has a variable input voltage Vin that varies, e.g., in a range of 3.6V to 40V and four switches Q1, Q2, Q3, Q4 such as NFETs (n-channel MOSFETs) coupled to an inductor L. The USB-PD device 100 may support, e.g., up to 100 W (20V and 5 A) of power.

The USB-PD IC controller 104 drives the external switches Q1, Q2, Q3, Q4 of the buck-boost converter 102 via respective signals HS1, LS2, LS1, HS2 to regulate the voltage Vout of a USB voltage bus power (VBUS) line to which one or more USB Type-C devices are connected. This may include switching between one or more buck modes and one or more boost modes, depending on the power demand and input voltage level. The load(s) coupled to the VBUS line are represented by a capacitor Cload and corresponding resistor Rload. Cload may be reduced by at least 2× times using the analog-based detection technique described herein compared with using firmware to implement the detection. For example, Cload may have a capacitance of 0.5 millifarads (mF) or less compared to typically used capacitance of 1 mF.

The USB-PD IC controller 104 may be a single-chip IC controller manufactured on a semiconductor die. For example, the USB-PD IC controller 104 may be a single-chip IC device from the family of CCGxx USB controllers developed by Cypress Semiconductor Corporation, San Jose, California In another example, USB-PD IC controller 104 may be a single-chip IC that is manufactured as a System-on-Chip (SoC). In other embodiments, the USB-PD IC controller 104 may be a multi-chip module encapsulated in a single semiconductor package. Among other components, the USB-PD IC controller 104 includes a central processing unit (CPU) subsystem 106, peripheral interconnect 108, system resources 110, input/output (I/O) subsystem 112, USB-PD subsystem 114, and various terminals (e.g., pins) that are configured for receiving and sending signals.

The CPU subsystem 106 includes one or more CPUs 116, flash memory 118, SRAM (Static Random Access Memory) 120, and ROM (Read Only Memory) 122 that are coupled to system interconnect 124. The CPU 116 is a suitable processor that can operate in an IC or a SoC device. The flash memory 118 is non-volatile memory (e.g., NAND flash, NOR flash, etc.) that is configured for storing data, programs, and/or other firmware instructions. The flash memory 118 is tightly coupled within the CPU subsystem 106 for improved access times. The SRAM 120 is volatile memory that is configured for storing data and firmware instructions accessed by the CPU 116. The ROM 122 is read-only memory (or other suitable storage medium) that is configured for storing boot-up routines, configuration parameters, and other firmware parameters and settings. System interconnect 124 is a system bus (e.g., a single-level or multi-level Advanced High-Performance Bus, or AHB) that is configured as an interface that couples various components of the CPU subsystem 106 to each other, as well as a data and control interface between the various components of the CPU subsystem 106 and the peripheral interconnect 108.

The peripheral interconnect 108 is a peripheral bus (e.g., a single-level or multi-level AHB) that provides the primary data and control interface between the CPU subsystem 106 and its peripherals and other resources, such as the system resources 110, input/output (I/O) subsystem 112, and USB-PD subsystem 114. The peripheral interconnect 108 may include various controller circuits (e.g., direct memory access, or DMA controllers), which may be programmed to transfer data between peripheral blocks without burdening the CPU subsystem 106. In various embodiments, each of the components of the CPU subsystem 106 and the peripheral interconnect 108 may be different with each choice or type of CPU, system bus, and/or peripheral bus.

The system resources 110 include various electronic circuits that support the operation of USB-PD IC controller 104 in its various states and modes. For example, the system resources 110 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow the USB-PD IC controller 104 to draw and/or provide power from/to external sources with several different voltage and/or current levels and to support controller operation in several power states 126 (e.g., such as active state, sleep state, and a deep sleep state with clocks turned off). Further, in some embodiments the CPU subsystem 106 may be optimized for low-power operation with extensive clock gating and may include various internal controller circuits that allow the CPU 116 to operate in the various power states 126. For example, the CPU 116 may include a wake-up interrupt controller that is configured to wake the CPU 116 from a sleep state, thereby allowing power to be switched off when the IC chip is in the sleep state. The system resources 110 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. The system resources 110 may also include analog and/or digital circuit blocks that provide reset control and support external reset (XRES).

In various embodiments, the I/O subsystem 112 may include different types of I/O blocks and subsystems. For example, the I/O subsystem 112 may include GPIO (general purpose input output) blocks 128, TCPWM (timer/counter/pulse-width-modulation) blocks 130, and SCBs (serial communication blocks) 132. The GPIOs 128 include analog and/or digital circuits configured to implement various functions such as, for example, pull-ups, pull-downs, input threshold select, input and output buffer enabling/disabling, multiplex signals connected to various I/O pins, etc. The TCPWMs 130 include analog and/or digital circuits configured to implement timers, counters, pulse-width modulators, decoders and various other analog/mixed signal elements that are configured to operate on input/output signals. The SCBs 132 include analog and/or digital circuits configured to implement various serial communication interfaces such as, for example, I2C, SPI (serial peripheral interface), UART (universal asynchronous receiver/transmitter), CAN (Controller Area Network) interface, CXPI (Clock eXtension Peripheral Interface), etc.

The USB-PD subsystem 114 provides the interface to one or more USB Type-C ports and is configured to support USB communications as well other USB functionality, such as power delivery and battery charging. For example, one Type-C port may be coupled to the buck-boost converter 102. The USB-PD subsystem 114 includes the electro-static discharge (ESD) protection circuits required on a Type-C port. The USB-PD subsystem 114 also includes a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. The USB-PD subsystem 114 also provides the termination resistors (RP and RD) and corresponding switches, as required by the USB-PD specification, to implement connection detection, plug orientation detection, and power delivery roles over a Type-C cable. The USB-PD IC controller 104 (and/or the USB-PD subsystem 114 thereof) may also be configured to respond to communications defined in a USB-PD Specification such as, for example, SOP (start-of-packet), SOP', and SOP" messaging.

Among other circuitry, the USB-PD subsystem 114 may further include: one or more analog-to-digital convertors (ADCs) for converting various analog signals to digital signals; a VCONN FET; an error amplifier (ERROR AMP) for controlling the power source voltage applied to the VBUS line per a PD contract; a regulator (HV REG) for converting the power supply voltage to the precise voltage (e.g., 3-5V) needed by the USB-PD IC controller 104; a current sense amplifier (CSA) and an over-voltage protection (OVP) circuits for providing over-current (OCP) and over-voltage (OV) protection and under-voltage (UV) protection on the VBUS line with configurable thresholds and response times, e.g., via respective sense pins CSPIN, CSNN coupled to a first sense resistor Rsense and respective sense pins ISP, ISN coupled to a second sense resistor Rsen; a pulse width modulator (PWM); one or more gate drivers (GATE DRV) for controlling power switches (not shown) that turn ON and off the provision of power over the VBUS line; a low-side gate driver (LSDR), a high-side gate driver (HSDR) for controlling the switches Q1, Q2, Q3, Q4 of the buck-boost converter 102; a communication channel PHY (CC BB PHY) logic for supporting communications on a Type-C Communication Channel (CC) line; a charging protocol detection block (CHG DET) to detect different type of PD chargers; at least two on-die discharge (VBUS DISCH) circuits that can discharge the VBUS line voltage to any of range of programmable voltage levels, and an analog detection circuit 134 for detecting VBUS load transients.

Described next in more detail is the VBUS load transient detection technique implemented by the USB-PD IC controller 104 for the smooth transition mode.

Figure 2:
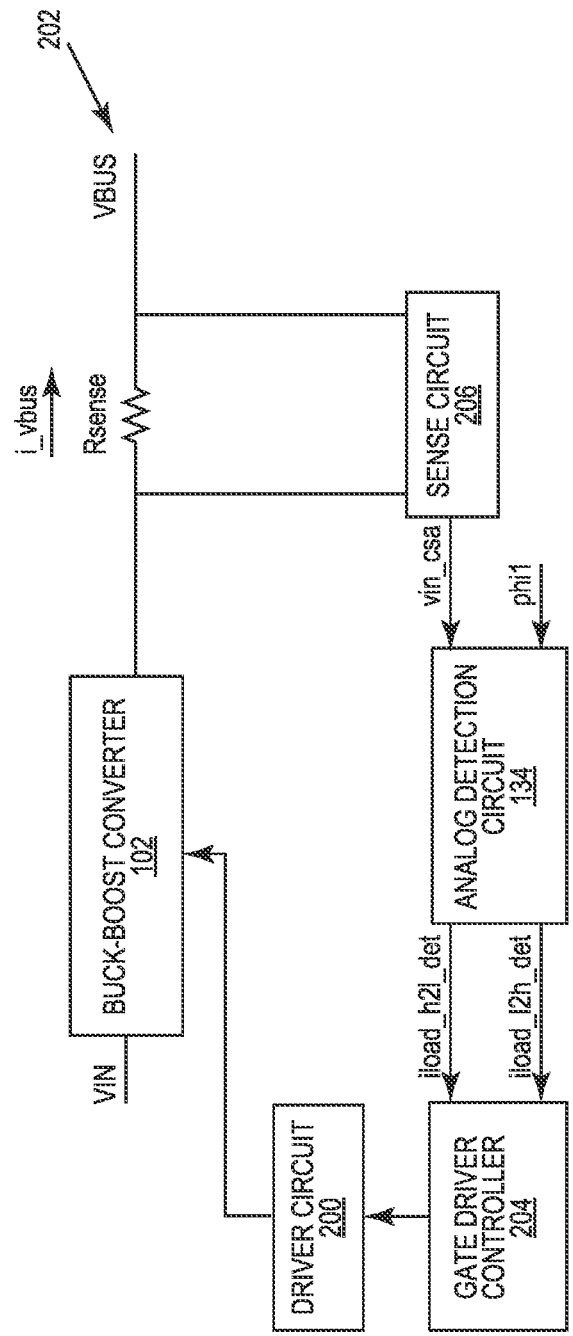
FIG. 2 illustrates transient load detection features of the USB-PD IC controller in more detail.
Figure 3:
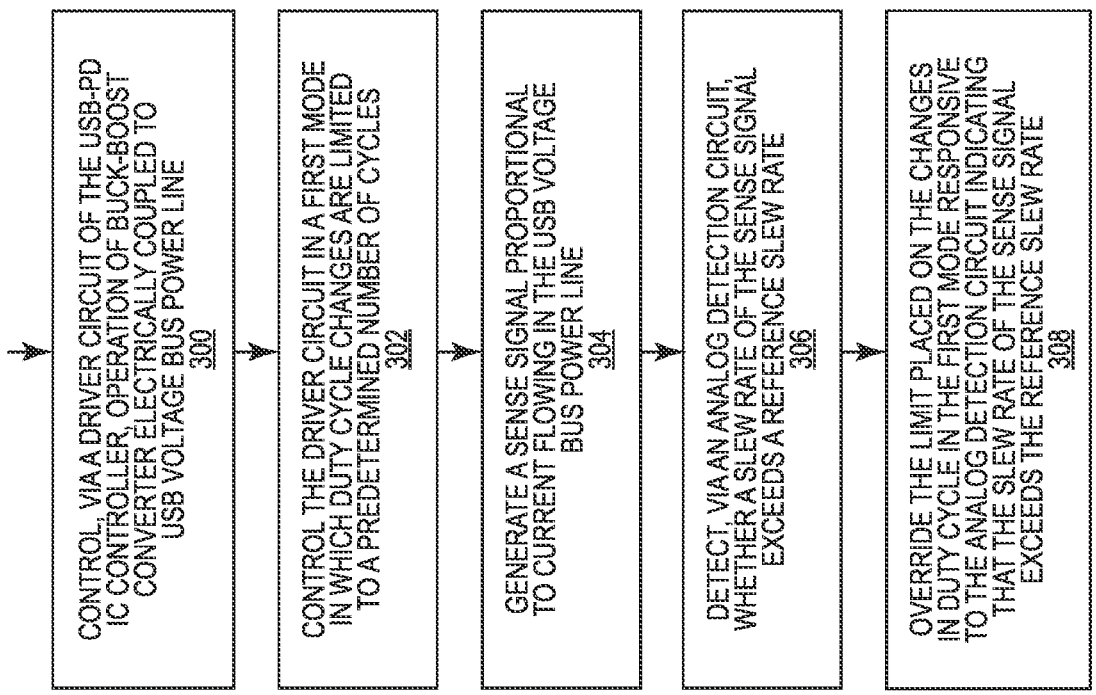
FIG. 3 illustrates a corresponding method of operating the USB-PD IC controller.

FIG. 2 illustrates an embodiment of the analog detection circuit 134 of the USB-PD IC controller 104 in more detail. FIG. 3 illustrates a corresponding method of operating the USB-PD IC controller 104.

A driver circuit 200 such as a gate driver controls operation of the buck-boost converter electrically coupled to the USB voltage bus power line 202 (block 300 of FIG. 3). A gate driver controller 204, which may include a PWM (pulse width modulator) and a finite state machine, controls the driver circuit 200 in a smooth transition mode (block 302 of FIG. 3). Changes in duty cycle are limited by the gate driver controller 204 to a fixed number of cycles in the smooth transition mode. For example, the duty cycle may be fixed for every 2 consecutive switching cycles in the smooth transition mode. If there is a sudden VBUS transient in the smooth transition mode, the duty cycle may be required to change by more than the initial limit to yield acceptable VBUS overshoot/undershoot. The analog detection circuit 134 enables timely relaxation of the duty cycle limit applied by the gate driver controller 204 in the smooth transition mode, to reduce VBUS overshoot/undershoot.

In more detail, a sense circuit 206 generates a sense signal vin_csa proportional to current i_vbus flowing in the USB voltage bus power line 202 (block 304 of FIG. 3). The analog detection circuit 134, instead of firmware loaded in the gate driver controller 204, detects whether the slew rate of the sense signal vin_csa exceeds a reference slew rate (block 306 of FIG. 3). The term 'slew rate' as used herein means the change of voltage or current, per unit of time. The gate driver controller 204 overrides the initial limit placed on duty cycle changes in the smooth transition mode responsive to the analog detection circuit 134 indicating that the slew rate of the sense signal vin_csa exceeds the reference slew rate (block 308 of FIG. 3).

In one embodiment, the sense circuit 206 is implemented as a current sense amplifier coupled to a sense resistor Rsense included in the USB voltage bus power line 202 and vin_csa=i_vbus*Rsense*Av_csa where Av_csa is the gain of the current sense amplifier. According to this embodiment, the reference slew rate is a reference voltage slew rate and the analog detection circuit 134 detects whether the slew rate of the voltage signal vin_csa generated by the sense circuit 206 exceeds the reference voltage slew rate.

The VBUS load transient detection technique is described next in more detail with reference to FIGS. 4 through 9.

Figure 4:
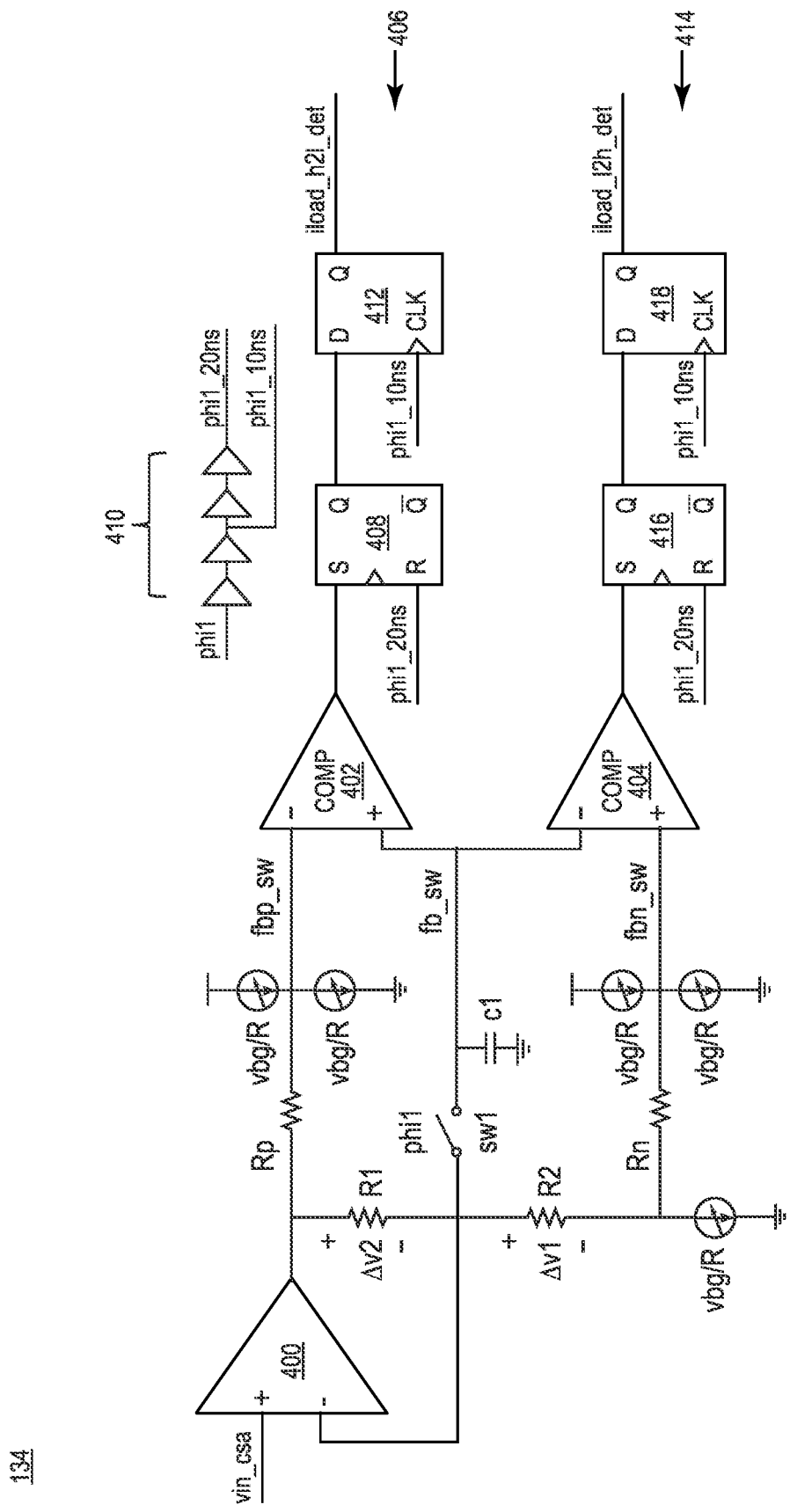
FIG. 4 illustrates an embodiment of an analog detection circuit included in the USB-PD IC controller.
Figure 5:
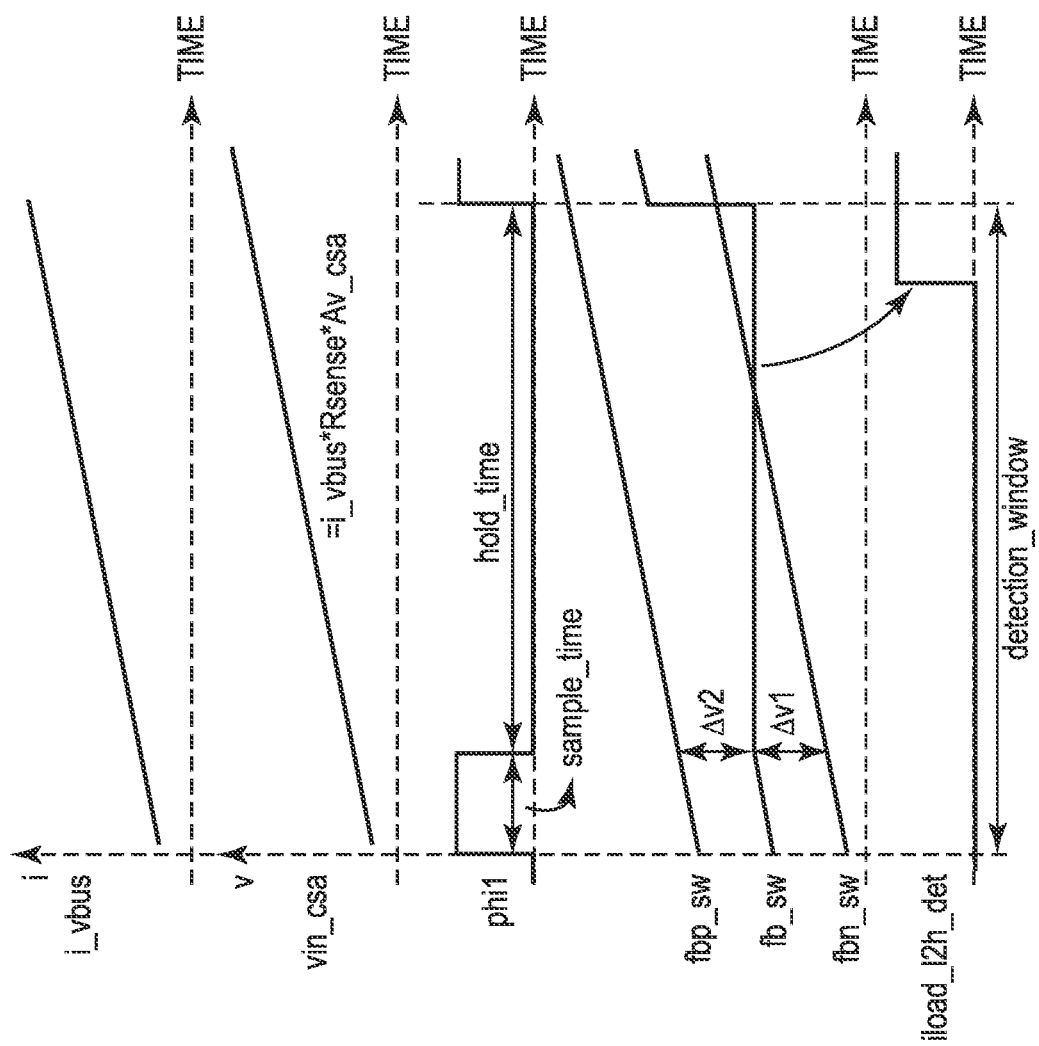
FIG. 5 illustrates corresponding waveforms associated with the operation of the analog detection circuit.

FIG. 4 illustrates an embodiment of the analog detection circuit 134. FIG. 5 illustrates corresponding waveforms associated with the operation of the analog detection circuit 134 shown in FIG. 4.

In FIG. 4, the analog detection circuit 134 generates a first voltage fbn_sw, a second voltage fb_sw and a third voltage fbp_sw that each track the sense signal vin_csa over a sample time ('sample_time') of a detection window ('detection_window'). The first voltage fbn_sw, the second voltage fb_sw and the third voltage fbp_sw are offset from one another over the sample time, with the second voltage fb_sw being between the first voltage fbn_sw and the third voltage fbp_sw. The first voltage fbn_sw and the second voltage fb_sw are offset from one another by a first voltage offset $\Delta v1$ over the sample time (assuming voltage across Rn is zero, which is used for trimming random mismatch error). The third voltage fbp_sw and the second voltage fb_sw are also offset from one another by a second voltage offset $\Delta v2$ over the sample time (assuming voltage across Rp is zero, which is used for trimming random mismatch error). The first voltage offset $\Delta 1$ and the second voltage offset $\Delta 2$ may be the same or different. Both the first voltage offset $\Delta 1$ and the second voltage offset $\Delta 1$ may be programmable to detect different slew rates on the USB voltage bus power line 202. Both the first voltage offset $\Delta v1$ and the second voltage offset $\Delta v2$ may be generated based on a current source 'vbg/R' flowing through a corresponding resistor R2, R1. Each current source 'vbg/R' may be derived from a bandgap voltage 'vbg' reference divided by a different resistor 'R'.

The first voltage fbn_sw and the third voltage fbp_sw continue to track the sense signal vin_csa over a hold time ('hold_time') of the detection window which follows the sample time, but the second voltage fb_sw does not. The duration of the sample time is determined by a sample-and-hold clock signal 'phi1' which may be generated, e.g., by RTL (Resistor-Transistor Logic) and input to the analog detection circuit 134. The analog detection circuit 134 holds the level of the second voltage fb_sw at the end of the sample time over the hold time. That is, node fb_sw is floating over the hold time and the voltage is held, e.g., using a capacitor c1. This aspect is shown in FIG. 5, where fb_sw stops tracking vin_csa at the end of the sample time and holds steady at the same level over the hold time. Unlike fb_sw which remains unchanged over the hold time, both fbn_sw and fbp_sw continue to track vin_csa over the hold time.

The hold time may be programmable to detect different slew rates on the USB voltage bus power line 202. The sample time may be programmable such that the level of the second voltage fb_sw held at the end of the sample time is adjustable. Programmable values such as slew rates, hold times, $\Delta v1$, $\Delta v2$, etc. may be programmed as per slew rate detection requirement and may be stored.

The analog detection circuit 134 indicates a voltage overshoot condition on the USB voltage bus power line 202 if the first voltage fbn_sw exceeds the held level of the second voltage fb_sw at any point during the hold time of the detection window. This aspect is shown in FIG. 5, where the signal iload_l2h_det is activated when first voltage fbn_sw exceeds the held level of fb_sw before the end of the hold time. The analog detection circuit 134 similarly indicates a voltage undershoot condition on the USB voltage bus power line 202 if the third voltage fbp_sw drops below the held level of the second voltage fb_sw at any point during the hold time of the detection window.

In one embodiment, the analog detection circuit 134 includes a non-inverting amplifier 400, a capacitor C1 for holding the level of the second voltage fb_sw at the end of the sample time over the hold time, and a sample-and-hold switch device sw1 such as a transistor coupling the capacitor c1 to the inverting input ('-') of the non-inverting amplifier 400. The sample-and-hold switch device sw1 is controlled by the sample-and-hold clock signal phi1. The size of the sample-and-hold switch device sw1 and the size of the capacitor c1 may be selected to ensure the capacitor c1 is fully charged by the end of the sample time.

A first comparator 402 of the analog detection circuit 134 receives the third voltage fbp_sw as a negative input and the voltage across the capacitor c1 as a positive input. A second comparator 404 of the analog detection circuit 134 receives the voltage across the capacitor c1 as a negative input and the first voltage fbn_sw as a positive input. The first voltage fbn_sw tracks the inverting input of the non-inverting amplifier 400. The third voltage fbp_sw tracks the output of the non-inverting amplifier 400. The first comparator 402 indicates a voltage undershoot condition on the USB voltage bus power line 202 if the third voltage fbp_sw drops below the voltage held by the capacitor c1 during the hold time of the detection window. The second comparator 404 indicates a voltage overshoot condition on the USB voltage bus power line 202 if the first voltage fbn_sw exceeds the voltage held by the capacitor c1 during the hold time of the detection window.

The output of the first comparator 402 may be captured by a first sample-and-hold circuit 406. The first sample-and-hold circuit 406 may include a first SR (set-reset) latch 408 having its set (S) input coupled to the output of the first comparator 402 and its reset (R) input actuated by a first clock signal phi1_20 ns derived from the sample-and-hold clock signal phi1 by a delay chain 410. For example, the first clock signal phi1_20 ns may correspond to the sample-and-hold clock signal phi1 delayed by 20 ns or some other delay. The Q output of the first SR latch 408 is input to the D-input of a first D flip-flop 412. The clock input CLK of the first D flip-flop 412 is actuated by a second clock signal phi1_10 ns derived from the sample-and-hold clock signal phi1 by the delay chain 410, but with less delay than the first clock signal phi1_20 ns. For example, the second clock signal phi1_10 ns may have half the delay of the first clock signal phi1_20 ns (e.g., 10 ns delay in the case of phi1_20 ns having 20 ns delay). The Q-output of the first D flip-flop 412 activates the signal iload_h2l_det to indicate a voltage undershoot condition on the USB voltage bus power line 202 when the first comparator 402 detects that the third voltage fbp_sw drops below the voltage held by the capacitor c1 during the hold time of the detection window.

The output of the second comparator 404 may be similarly captured by a second sample-and-hold circuit 414. The second sample-and-hold circuit 414 may include a second SR latch 416 having its set (S) input coupled to the output of the second comparator 404 and its reset (R) input actuated by the first clock signal phi1_20 ns derived by the delay chain 410. The Q output of the second SR latch 416 is input to the D-input of a second D flip-flop 418. The clock input CLK of the second D flip-flop 418 is actuated by the second clock signal phi1_10 ns derived by the delay chain 410. The Q-output of the second D flip-flop 418 activates the signal iload_l2h_det to indicate a voltage overshoot condition on the USB voltage bus power line 202 when the second comparator 402 detects that the first voltage fbn_sw exceeds the voltage held by the capacitor c1 during the hold time of the detection window.

During the sample time of the detection window, the sample-and-hold switch device sw1 is ON. The voltage difference fb_sw−fbn_sw is set to a first known value $\Delta v1$ and the voltage difference fbp_sw−fb_sw is similarly set to a second known value $\Delta v2$. Each known value $\Delta v1$, $\Delta v2$ corresponds to $\Delta I\_prog$ at i_vbus level where $\Delta I\_prog=\Delta V/(Av\_csa*Rsense)$ and $\Delta V=\Delta v1$ or $\Delta v2$. Each known value $\Delta v1$, $\Delta v2$ is generated based on the current source 'vbg/R' flowing through a corresponding resistor Rp/Rn, so that $\Delta v1$, $\Delta v2$ is dependent only on the bandgap voltage vbg and is independent of process, voltage and temperature variations. The known voltage offsets $\Delta v1$, $\Delta v2$ may be the same, as explained above. In this case, $\Delta V=\Delta v1=\Delta v2$.

During the hold time of the detection window, the sample-and-hold switch device sw1 is OFF. When sample-and-hold switch device sw1 turns off, node fb_sw holds its value at the time of sw1 turn-off via capacitor C1 for the remainder of the hold time, whereas node fbp_sw and fbn_sw continue to track vin_csa. If vin_csa increases by more than $\Delta v1$ over the detection window, a low-to-high load transient detection is indicated by the iload_l2h_det output signal. Similarly, if vin_csa decreases by more than $\Delta v2$ over the detection window, a high-to-low load transient detection is indicated by the iload_h2l_det output signal. In general, any VBUS load transient that is greater than $$\frac{\Delta I\_prog}{hold\_time}$$

slew rate is quickly detected by the analog detection circuit 134 instead of by slower firmware.

In this architecture, the detection threshold may be scaled to detect different slew rates either by changing $\Delta v1/\Delta v2$ or the hold time. For example, the hold time may be programmed from 0 to 511 cycles of a 21 ns/42 ns clock period, $\Delta v1=\Delta v2$ may be set to 105 mV which corresponds to $\Delta I\_prog=300$ mA for Av_csa=70 and Rsense=5 mΩ, and the hold time may be set to 3 us to detect 300 mA/3 us load transient or 1 A/10 us load transient. Table 1 below shows additional programmable options, which may be realized with different $\Delta V$ (for the case where $\Delta v1=\Delta v2$) and hold time settings.

TABLE 1

Example Load Transient Detection Threshold Options

| | Hold time = 1 us | Hold time = 2 us | Hold time = 3 us | Hold time = 4 us | Hold time = 5 us |
|---|---|---|---|---|---|
| $\Delta V(mV) = 75$ mv | 1 A/4.67 us | 1 A/9.33 us | 1 A/14 us | 1 A/18.67 us | 1 A/23.33 us |
| $\Delta V(mV) = 90$ mv | 1 A/3.89 us | 1 A/7.78 us | 1 A/11.67 us | 1 A/15.56 us | 1 A/19.44 us |
| $\Delta V(mV) = 105$ mv | 1 A/3.33 us | 1 A/6.67 us | 1 A/10 us | 1 A/13.33 us | 1 A/16.67 us |
| $\Delta V(mV) = 120$ mv | 1 A/2.92 us | 1 A/5.83 us | 1 A/8.75 us | 1 A/11.67 us | 1 A/14.58 us |
| $\Delta V(mV) = 135$ mv | 1 A/2.59 us | 1 A/5.19 us | 1 A/7.78 us | 1 A/10.37 us | 1 A/12.96 us |
| $\Delta V(mV) = 150$ mv | 1 A/2.33 us | 1 A/4.67 us | 1 A/7 us | 1 A/9.33 us | 1 A/11.67 us |
| $\Delta V(mV) = 165$ mv | 1 A/2.12 us | 1 A/4.24 us | 1 A/6.36 us | 1 A/8.48 us | 1 A/10.61 us |

The hold time of the detection window may be decided based on a detection threshold at which detection is required. The sampling time of the detection window should be low as any load transient in sampling time is not processed. The allowed sampling time may be decided based on the application in which the USB-PD device 100 is used. For example, as per USB-PD specification, the maximum allowed load transient is 15 A/10 us, so in 400 ns the load current may change by 60 mA, which is very small for VBUS to overshoot/undershoot. So, in this example, 400 ns may be used as the sampling time.

The sizing of capacitor C1 and sample-and-hold switch device sw1 may be dependent on the sampling time, as capacitor C1 charges through sample-and-hold switch device sw1. To meet the sampling time, either the size of sample-and-hold switch device sw1 is increased or the size of capacitor C1 is reduced. However, increasing the size of sample-and-hold switch device sw1 may cause charge injection issues and reducing the size of capacitor C1 makes node fb_sw sensitive to noise/coupling. Accordingly, sizing of sample-and-hold switch device sw1 and capacitor C1 should be optimized to take care of charge injection, noise/coupling issues and to meet the target sampling time, e.g., 400 ns in the above example.

Figure 6:
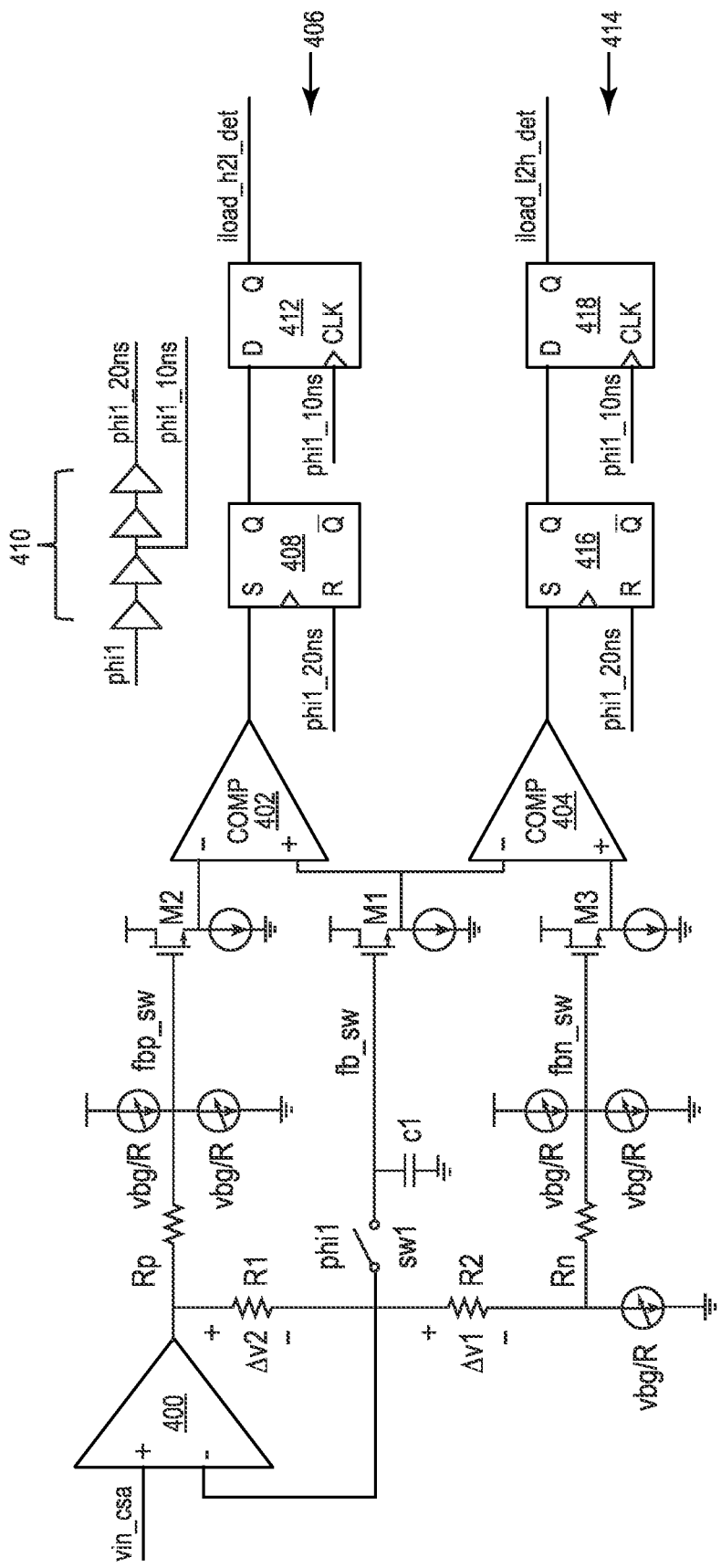
FIG. 6 illustrates another embodiment of the analog detection circuit included in the USB-PD IC controller.

FIG. 6 illustrates another embodiment of the analog detection circuit 134. The embodiment illustrated in FIG. 6 is similar to the embodiment illustrated in FIG. 4. Different, however, capacitor C1 is electrically coupled to both the positive input of the first comparator 402 and the negative input of the second comparator 404 through a first source follower M1. The third voltage node fbp_sw is electrically coupled to the negative input of the first comparator 402 through a second source follower M2. The first voltage node fbn_sw is electrically coupled to the positive input of the second comparator 404 through a third source follower M3. The source followers M1, M2, M3 avoid back coupling on node fb_sw from the comparators 402, 404 during the hold time.

Figure 7:
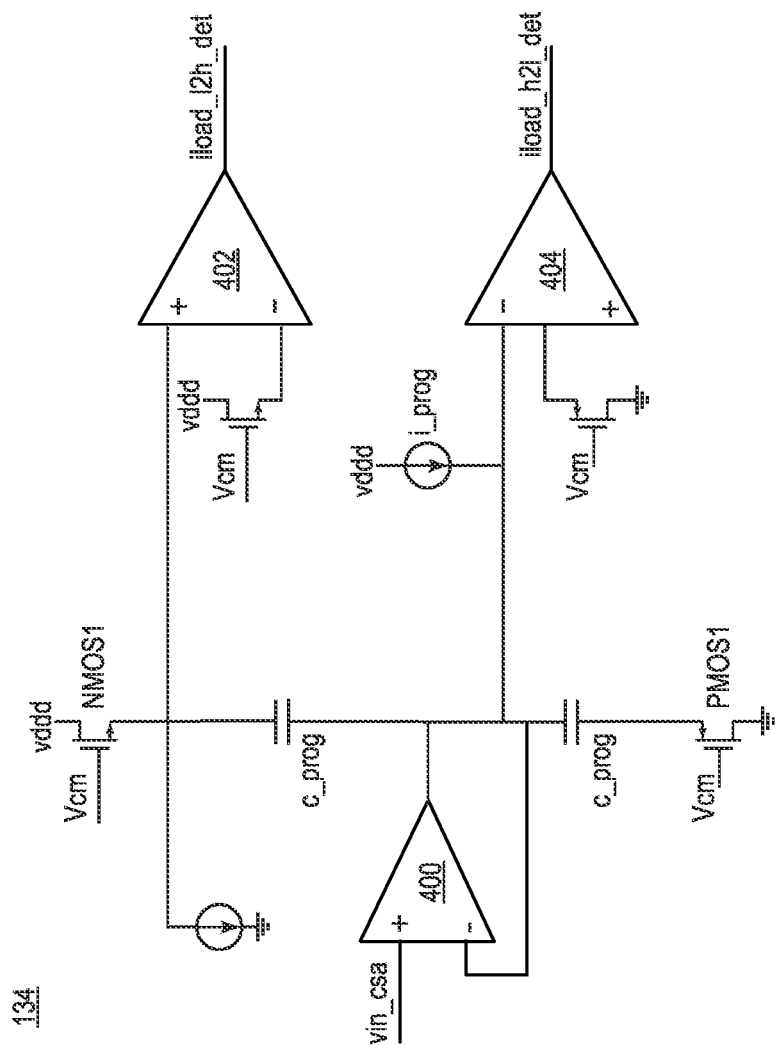
FIG. 7 illustrates another embodiment of the analog detection circuit included in the USB-PD IC controller.

FIG. 7 illustrates another embodiment of the analog detection circuit 134. This embodiment is based on $$\frac{I}{C}$$

method, i.e., current flowing into a capacitor c_prog. The reference slew rate threshold at which detection is required is decided by i_prog and c_prog values. If vin_csa changes by more than the reference slew rate, a detection occurs in one of the comparator outputs iload_h2l_det, iload_l2h_det based on a high-to-low change detected by the second comparator 404 or a low-to-high change detected by the first comparator 402. For example, for iload_l2h_det comparator output, the top plate of capacitor c_prog is discharged by $$\frac{i\_prog}{c\_prog}$$

slew rate. The bottom plate of capacitor c_prog is connected to vin_csa. If vin_csa increases at a slew rate more than $$\frac{i\_prog}{c\_prog},$$

then the positive terminal of the first comparator 402 becomes higher and the comparator output iload_l2h_det trips to indicate vin_csa slew rate is more than $$\frac{i\_prog}{c\_prog}.$$

Figure 8:
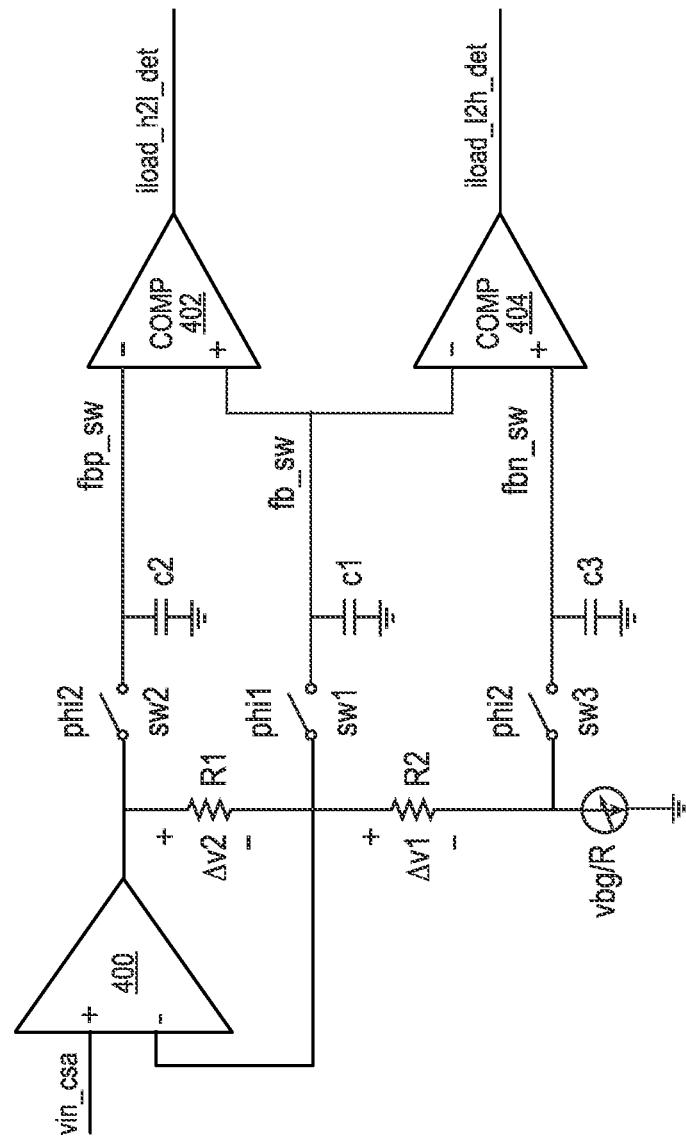
FIG. 8 illustrates another embodiment of the analog detection circuit included in the USB-PD IC controller.
Figure 9:
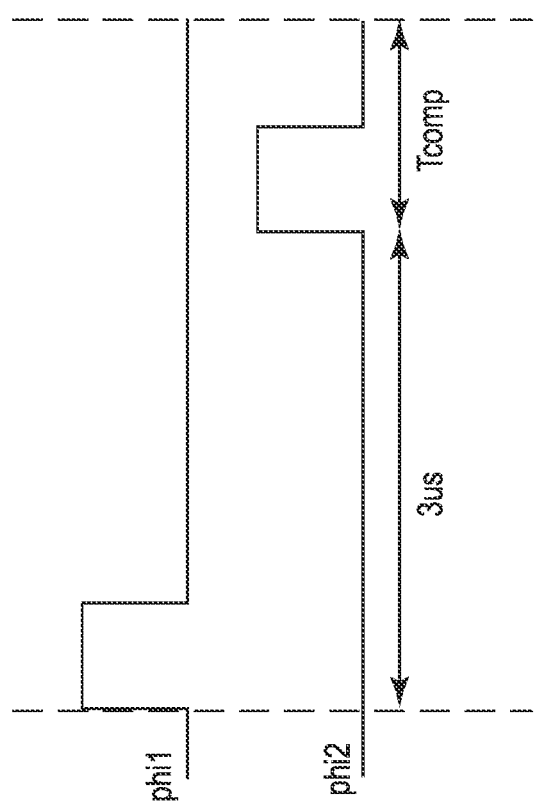
FIG. 9 illustrates the relationship between first and second sample-and-hold clock signals used by the analog detection circuit of FIG. 8.

FIG. 8 illustrates another embodiment of the analog detection circuit 134. According to this embodiment, each voltage path/node fbn_sw, fb_sw, fbp_sw of the analog detection circuit includes a sample-and-hold switch device sw1, sw2, sw3 coupled to a respective capacitor C1, C2, C3. Two (2) sample-and-hold clock signals 'phi1', 'phi2' are generated for controlling the ON/OFF state of the sample-and-hold switch devices sw1, sw2, sw3. The sample-and-hold switch device sw1 in the second voltage path/node fb_sw is controlled by the first sample-and-hold clock signal phi1. The sample-and-hold switch devices sw2, sw3 in the first and third voltage paths/nodes fbn_sw, fbp_sw are controlled by the second sample-and-hold clock signal phi2. FIG. 9 illustrates the relationship between the first and second sample-and-hold clock signals phi1, phi2 where 'Tcomp' represents the comparison window during which the comparator outputs iload_h2l_det, iload_l2h_det are valid.

Although the present disclosure is not so limited, the following numbered examples demonstrate one or more aspects of the disclosure.

Example 1. A Universal Serial Bus (USB)-Power Delivery (PD) integrated circuit (IC) controller, the USB-PD IC controller comprising: a driver circuit configured to control operation of a buck-boost converter electrically coupled to a USB voltage bus power line; a gate driver controller configured to control the driver circuit in a first mode, wherein changes in duty cycle are limited to a predetermined number of cycles in the first mode; a sense circuit configured to generate a sense signal proportional to current flowing in the USB voltage bus power line; and an analog detection circuit configured to detect whether a slew rate of the sense signal exceeds a reference slew rate, wherein the gate driver controller is configured to override the limit placed on the changes in duty cycle in the first mode responsive to the analog detection circuit indicating that the slew rate of the sense signal exceeds the reference slew rate.

Example 2. The USB-PD IC controller of example 1, wherein the sense signal generated by the sense circuit is a voltage signal that is proportional to the current flowing in the USB voltage bus power line, wherein the reference slew rate is a reference voltage slew rate, and wherein the analog detection circuit is configured to detect whether a slew rate of the voltage signal generated by the sense circuit exceeds the reference voltage slew rate.

Example 3. The USB-PD IC controller of example 1 or 2, wherein: the analog detection circuit is configured to generate a first voltage, a second voltage and a third voltage that each track the sense signal over a sample time of a detection window; the first voltage, the second voltage and the third voltage are offset from one another over the sample time, with the second voltage being between the first voltage and the third voltage; the first voltage and the third voltage continue to track the sense signal over a hold time of the detection window which follows the sample time; and the analog detection circuit is configured to hold a level of the second voltage at the end of the sample time over the hold time.

Example 4. The USB-PD IC controller of example 3, wherein the first voltage offset and the second voltage offset are the same.

Example 5. The USB-PD IC controller of example 3 or 4, wherein both the first voltage offset and the second voltage offset are programmable to detect different slew rates on the USB voltage bus power line.

Example 6. The USB-PD IC controller of any of examples 3 through 5, wherein both the first voltage offset and the second voltage offset are generated based on a current source flowing through a resistor, and wherein the current source is derived from a bandgap voltage reference divided by a different resistor.

Example 7. The USB-PD IC controller of any of examples 3 through 6, wherein the hold time is programmable to detect different slew rates on the USB voltage bus power line.

Example 8. The USB-PD IC controller of any of examples 3 through 7, wherein the sample time is programmable such that the level of the second voltage held at the end of the sample time is adjustable.

Example 9. The USB-PD IC controller of any of examples 3 through 8, wherein the analog detection circuit comprises a non-inverting amplifier, a capacitor for holding the level of the second voltage at the end of the sample time over the hold time, and a sample-and-hold switch device coupling the capacitor to an inverting input of the non-inverting amplifier, and wherein the sample-and-hold switch device is controlled by a sample-and-hold clock signal. the sample-and-hold switch device is closed during the sample time of the detection window and a voltage across the capacitor tracks the inverting input of the non-inverting amplifier and the sample-and-hold switch device is opened at the end of the sample time and the capacitor is disconnected from the inverting input of the non-inverting amplifier.

Example 10. The USB-PD IC controller of example 9, wherein the analog detection circuit comprises: a first comparator having the third voltage as a negative input and the voltage across the capacitor as a positive input; and a second comparator having the voltage across the capacitor as a negative input and the first voltage as a positive input, wherein the first voltage tracks the inverting input of the non-inverting amplifier, wherein the third voltage tracks an output of the non-inverting amplifier, wherein the first comparator indicates a voltage undershoot condition on the USB voltage bus power line if the third voltage drops below the voltage held by the capacitor during the hold time of the detection window, wherein the second comparator indicates a voltage overshoot condition on the USB voltage bus power line if the first voltage exceeds the voltage held by the capacitor during the hold time of the detection window.

Example 11. The USB-PD IC controller of example 10, wherein the capacitor is electrically coupled to both the positive input of the first comparator and the negative input of the second comparator through a first source follower, wherein the third voltage is electrically coupled to the negative input of the first comparator through a second source follower, and wherein the first voltage is electrically coupled to the positive input of the second comparator through a third source follower.

Example 12. The USB-PD IC controller of any of examples 9 through 11, wherein a size of the sample-and-hold switch device and a size of the capacitor are selected to ensure the capacitor is fully charged by the end of the sample time.

Example 13. The USB-PD IC controller of any of examples 1 through 12, wherein the analog detection circuit is configured to indicate a voltage overshoot condition on the USB voltage bus power line based on a first signal from a first sample-and-hold circuit, and wherein the analog detection circuit is configured to indicate a voltage undershoot condition on the USB voltage bus power line based on a second signal from a second sample-and-hold circuit.

Example 14. The USB-PD IC controller of any of examples 1 through 13, wherein the analog detection circuit comprises a first voltage path, a second voltage path and a third voltage path that each include a sample-and-hold switch device coupled to a respective capacitor.

Example 15. The USB-PD IC controller of any of examples 1 through 14, wherein the gate driver controller is configured to implement a state machine for controlling the driver circuit in the first mode.

Example 16. The USB-PD IC controller of any of examples 1 through 12, wherein: the analog detection circuit comprises a first voltage path, a second voltage path and a third voltage path; a voltage of the first voltage path and a voltage of the third voltage path both track the sense signal over both a sample time and a hold time of a detection window, with the hold time following the sample time; the analog detection circuit is configured to hold a voltage of the second voltage path at the end of the sample time over the hold time such that the voltage of the second voltage path tracks the sense signal over the sample time but not the hold time; the analog detection circuit is configured to indicate a voltage overshoot condition if the voltage of the first voltage path exceeds the held voltage of the second voltage path during the hold time; and the analog detection circuit is configured to indicate a voltage undershoot condition if the voltage of the third voltage path drops below the held voltage of the second voltage path during the hold time.

Example 17. The USB-PD IC controller of example 16, wherein the first voltage path, the second voltage path and the third voltage path each include a sample-and-hold switch device coupled to a respective capacitor, wherein a first sample-and-hold clock signal actuates the sample-and-hold switch device of the second voltage path, wherein a second sample-and-hold clock signal actuates the sample-and-hold switch device of both the first voltage path and the third voltage path, and wherein the second sample-and-hold clock signal is active after the first sample-and-hold clock signal such that the sample-and-hold switch device of the second voltage path is closed to charge the respective capacitor and then opened before the sample-and-hold switch device of either the first voltage path or the third voltage path is closed to charge the respective capacitor.

Example 18. The USB-PD IC controller of any of examples 1 through 17, wherein the analog detection circuit is a sample-and-hold circuit configured to sample an internal node voltage which tracks the sense signal over a sample time of a detection window and hold the internal node voltage at the end of the sample time over a hold time of the detection window which follows the sample time, and wherein the reference slew rate corresponds to $\Delta v$ divided by the hold time.

Example 19. A method of operating a Universal Serial Bus (USB)-Power Delivery (PD) integrated circuit (IC) controller, the method comprising: controlling, via a driver circuit of the USB-PD IC controller, operation of a buck-boost converter electrically coupled to a USB voltage bus power line; controlling the driver circuit in a first mode, wherein changes in duty cycle are limited to a predetermined number of cycles in the first mode; generating a sense signal proportional to current flowing in the USB voltage bus power line; detecting, via an analog detection circuit, whether a slew rate of the sense signal exceeds a reference slew rate; and overriding the limit placed on the changes in duty cycle in the first mode responsive to the analog detection circuit indicating that the slew rate of the sense signal exceeds the reference slew rate.

Example 20. The method of example 19, wherein detecting, via the analog detection circuit, whether a slew rate of the sense signal exceeds a reference slew rate comprises: generating a first voltage, a second voltage and a third voltage that each track the sense signal over a sample time of a detection window, the first voltage, the second voltage and the third voltage being offset from one another over the sample time, with the second voltage being between the first voltage and the third voltage; continuing to track, via the first voltage and the third voltage, the sense signal over a hold time of the detection window which follows the sample time; holding a level of the second voltage at the end of the sample time over the hold time; indicating a voltage overshoot condition on the USB voltage bus power line if the first voltage exceeds the held level of the second voltage at any point during the hold time; and indicating a voltage undershoot condition on the USB voltage bus power line if the third voltage drops below the held level of the second voltage at any point during the hold time.

Example 21. A Universal Serial Bus (USB)-Power Delivery (PD) device, comprising: a buck-boost converter electrically coupled to a USB voltage bus power line; and a USB-PD integrated circuit (IC) controller coupled to control operation of the buck-boost converter, the USB-PD IC controller comprising: a gate driver controller configured to control the buck-boost converter in a first mode, wherein changes in duty cycle are limited to a predetermined number of cycles in the first mode; a sense circuit configured to generate a sense signal proportional to current flowing in the USB voltage bus power line; and an analog detection circuit configured to detect whether a slew rate of the sense signal exceeds a reference slew rate, wherein the gate driver controller is configured to override the limit placed on the changes in duty cycle in the first mode responsive to the analog detection circuit indicating that the slew rate of the sense signal exceeds the reference slew rate.

Example 22. The USB-PD device of example 21, wherein the analog detection circuit is configured to indicate a voltage overshoot condition on the USB voltage bus power line based on a first signal from a first sample-and-hold circuit, and wherein the analog detection circuit is configured to indicate a voltage undershoot condition on the USB voltage bus power line based on a second signal from a second sample-and-hold circuit.

Example 23. The USB-PD device of example 21 or 22, wherein: the analog detection circuit of the USB-PD IC controller is configured to generate a first voltage, a second voltage and a third voltage that each track the sense signal over a sample time of a detection window; the first voltage, the second voltage and the third voltage are offset from one another over the sample time, with the second voltage being between the first voltage and the third voltage; the first voltage and the third voltage continue to track the sense signal over a hold time of the detection window which follows the sample time; the analog detection circuit of the USB-PD IC controller is configured to hold a level of the second voltage at the end of the sample time over the hold time; the analog detection circuit of the USB-PD IC controller is configured to indicate a voltage overshoot condition on the USB voltage bus power line if the first voltage exceeds the held level of the second voltage at any point during the hold time; and the analog detection circuit of the USB-PD IC controller is configured to indicate a voltage undershoot condition on the USB voltage bus power line if the third voltage drops below the held level of the second voltage at any point during the hold time.

Example 24. The USB-PD device of any of examples 21 through 23, further comprising a USB Type-C port coupled to the buck-boost converter.

Example 25. The USB-PD device of any of examples 21 through 24, further comprising a capacitor electrically coupled to the USB voltage bus power line, wherein the capacitor has a capacitance of 0.5 millifarads or less.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A Universal Serial Bus (USB)-Power Delivery (PD) integrated circuit (IC) controller, the USB-PD IC controller comprising:
a driver circuit configured to control operation of a buck-boost converter electrically coupled to a USB voltage bus power line;
a gate driver controller configured to control the driver circuit in a first mode, wherein changes in duty cycle are limited to a predetermined number of cycles in the first mode;
a sense circuit configured to generate a sense signal proportional to current flowing in the USB voltage bus power line; and
an analog detection circuit configured to detect whether a slew rate of the sense signal exceeds a reference slew rate,
wherein the gate driver controller is configured to override the limit placed on the changes in duty cycle in the first mode responsive to the analog detection circuit indicating that the slew rate of the sense signal exceeds the reference slew rate.

2. The USB-PD IC controller of claim 1, wherein the sense signal generated by the sense circuit is a voltage signal that is proportional to the current flowing in the USB voltage bus power line, wherein the reference slew rate is a reference voltage slew rate, and wherein the analog detection circuit is configured to detect whether a slew rate of the voltage signal generated by the sense circuit exceeds the reference voltage slew rate.

3. The USB-PD IC controller of claim 1, wherein:
- the analog detection circuit is configured to generate a first voltage, a second voltage and a third voltage that each track the sense signal over a sample time of a detection window;
- the first voltage, the second voltage and the third voltage are offset from one another over the sample time, with the second voltage being between the first voltage and the third voltage;
- the first voltage and the third voltage continue to track the sense signal over a hold time of the detection window which follows the sample time; and
- the analog detection circuit is configured to hold a level of the second voltage at the end of the sample time over the hold time.

4. The USB-PD IC controller of claim 3, wherein the first voltage offset and the second voltage offset are the same.

5. The USB-PD IC controller of claim 3, wherein both the first voltage offset and the second voltage offset are programmable to detect different slew rates on the USB voltage bus power line.

6. The USB-PD IC controller of claim 3, wherein both the first voltage offset and the second voltage offset are generated based on a current source flowing through a resistor, and wherein the current source is derived from a bandgap voltage reference divided by a different resistor.

7. The USB-PD IC controller of claim 3, wherein the hold time is programmable to detect different slew rates on the USB voltage bus power line.

8. The USB-PD IC controller of claim 3, wherein the sample time is programmable such that the level of the second voltage held at the end of the sample time is adjustable.

9. The USB-PD IC controller of claim 3, wherein the analog detection circuit comprises a non-inverting amplifier, a capacitor for holding the level of the second voltage at the end of the sample time over the hold time, and a sample-and-hold switch device coupling the capacitor to an inverting input of the non-inverting amplifier, and wherein the sample-and-hold switch device is controlled by a sample-and-hold clock signal.

10. The USB-PD IC controller of claim 9, wherein the analog detection circuit comprises:
- a first comparator having the third voltage as a negative input and the voltage across the capacitor as a positive input; and
- a second comparator having the voltage across the capacitor as a negative input and the first voltage as a positive input,
- wherein the first voltage tracks the inverting input of the non-inverting amplifier,
- wherein the third voltage tracks an output of the non-inverting amplifier,
- wherein the first comparator indicates a voltage undershoot condition on the USB voltage bus power line if the third voltage drops below the voltage held by the capacitor during the hold time of the detection window,
- wherein the second comparator indicates a voltage overshoot condition on the USB voltage bus power line if the first voltage exceeds the voltage held by the capacitor during the hold time of the detection window.

11. The USB-PD IC controller of claim 10, wherein the capacitor is electrically coupled to both the positive input of the first comparator and the negative input of the second comparator through a first source follower, wherein the third voltage is electrically coupled to the negative input of the first comparator through a second source follower, and wherein the first voltage is electrically coupled to the positive input of the second comparator through a third source follower.

12. The USB-PD IC controller of claim 9, wherein a size of the sample-and-hold switch device and a size of the capacitor are selected to ensure the capacitor is fully charged by the end of the sample time.

13. The USB-PD IC controller of claim 1, wherein the analog detection circuit is configured to indicate a voltage overshoot condition on the USB voltage bus power line based on a first signal from a first sample-and-hold circuit, and wherein the analog detection circuit is configured to indicate a voltage undershoot condition on the USB voltage bus power line based on a second signal from a second sample-and-hold circuit.

14. The USB-PD IC controller of claim 1, wherein the analog detection circuit comprises a first voltage path, a second voltage path and a third voltage path that each include a sample-and-hold switch device coupled to a respective capacitor.

15. The USB-PD IC controller of claim 1, wherein the gate driver controller is configured to implement a state machine for controlling the driver circuit in the first mode.

16. A method of operating a Universal Serial Bus (USB)-Power Delivery (PD) integrated circuit (IC) controller, the method comprising:
- controlling, via a driver circuit of the USB-PD IC controller, operation of a buck-boost converter electrically coupled to a USB voltage bus power line;
- controlling the driver circuit in a first mode, wherein changes in duty cycle are limited to a predetermined number of cycles in the first mode;
- generating a sense signal proportional to current flowing in the USB voltage bus power line;
- detecting, via an analog detection circuit, whether a slew rate of the sense signal exceeds a reference slew rate; and
- overriding the limit placed on the changes in duty cycle in the first mode responsive to the analog detection circuit indicating that the slew rate of the sense signal exceeds the reference slew rate.

17. The method of claim 16, wherein detecting, via the analog detection circuit, whether a slew rate of the sense signal exceeds a reference slew rate comprises:
- generating a first voltage, a second voltage and a third voltage that each track the sense signal over a sample time of a detection window, the first voltage, the second voltage and the third voltage being offset from one another over the sample time, with the second voltage being between the first voltage and the third voltage;
- continuing to track, via the first voltage and the third voltage, the sense signal over a hold time of the detection window which follows the sample time;
- holding a level of the second voltage at the end of the sample time over the hold time;
- indicating a voltage overshoot condition on the USB voltage bus power line if the first voltage exceeds the held level of the second voltage at any point during the hold time; and
- indicating a voltage undershoot condition on the USB voltage bus power line if the third voltage drops below the held level of the second voltage at any point during the hold time.

18. A Universal Serial Bus (USB)-Power Delivery (PD) device, comprising:
- a buck-boost converter electrically coupled to a USB voltage bus power line; and a USB-PD integrated circuit (IC) controller coupled to control operation of the buck-boost converter, the USB-PD IC controller comprising:
  a gate driver controller configured to control the buck-boost converter in a first mode, wherein changes in duty cycle are limited to a predetermined number of cycles in the first mode;
  a sense circuit configured to generate a sense signal proportional to current flowing in the USB voltage bus power line; and
  an analog detection circuit configured to detect whether a slew rate of the sense signal exceeds a reference slew rate,
  wherein the gate driver controller is configured to override the limit placed on the changes in duty cycle in the first mode responsive to the analog detection circuit indicating that the slew rate of the sense signal exceeds the reference slew rate.

19. The USB-PD device of claim 18, wherein the analog detection circuit is configured to indicate a voltage overshoot condition on the USB voltage bus power line based on a first signal from a first sample-and-hold circuit, and wherein the analog detection circuit is configured to indicate a voltage undershoot condition on the USB voltage bus power line based on a second signal from a second sample-and-hold circuit.

20. The USB-PD device of claim 18, further comprising a USB Type-C port coupled to the buck-boost converter.

21. The USB-PD device of claim 18, further comprising a capacitor electrically coupled to the USB voltage bus power line, wherein the capacitor has a capacitance of 0.5 millifarads or less.

* * * * *